United States Patent

[11] 3,620,240

[72] Inventor William Bogdanski
7964 Burnfield Cres., Burnaby, British Columbia, Canada
[21] Appl. No. 19,347
[22] Filed Mar. 13, 1970
[45] Patented Nov. 16, 1971

[54] DOUBLE CHECK VALVE VENT
1 Claim, 4 Drawing Figs.
[52] U.S. Cl. ................................................. 137/202
[51] Int. Cl. ................................................. B65d 51/16, F16r 45/02
[50] Field of Search ................................. 137/202, 41, 423; 220/44 B, 44 R

[56] References Cited
UNITED STATES PATENTS
| | | | |
|---|---|---|---|
| 2,038,767 | 4/1936 | Spaeth | 220/44 X |
| 2,104,461 | 1/1938 | Holm | 220/44 X |
| 1,851,084 | 3/1932 | Brown | 220/44 UX |

*Primary Examiner* — Alan Cohan
*Attorney* — Berman, Davidson and Berman

ABSTRACT: A double check valve vent in which floatable valves are positioned in a vent line to be floated up against a valve seat when fluid flows outwardly from the tank or flows inwardly toward the tank. The floatable valve in the absence of fluid are each spaced a substantial distance from its respective valve seat so that fumes venting from the tank may move freely with a complete absence of back pressure.

PATENTED NOV 16 1971

3,620,240

INVENTOR.
WILLIAM BOGDANSKI,
BY
Berman, Davidson & Berman,
ATTORNEYS.

DOUBLE CHECK VALVE VENT

BACKGROUND OF THE INVENTION

1. Field of the Invention

The present invention relates to check valves for vent lines of the type to prevent the flow of fluid in either direction through the vent line.

2. Summary of the Invention

The present invention is directed to floatable check valves which are arranged to remain completely open in the absence of fluid but which will seal when fluid moves in the vent pipe in either direction.

The vent pipe is of the type used for fuel tanks on boats wherein it is important to prevent the flow of water through the vent line into the fuel tank and it is quite important to prevent the flow of gasoline or fuel oil out of the vent line and on to the boat where it would present a fire hazard.

The primary object of the invention is to provide a floatable double check valve for vent lines to control the flow of fluid in either direction therein without restraining the flow of gases therethrough.

Other objects and advantages will become apparent in the following specification when considered in the light of the attached drawings.

DESCRIPTION OF THE PREFERRED EMBODIMENT

Figure 1:
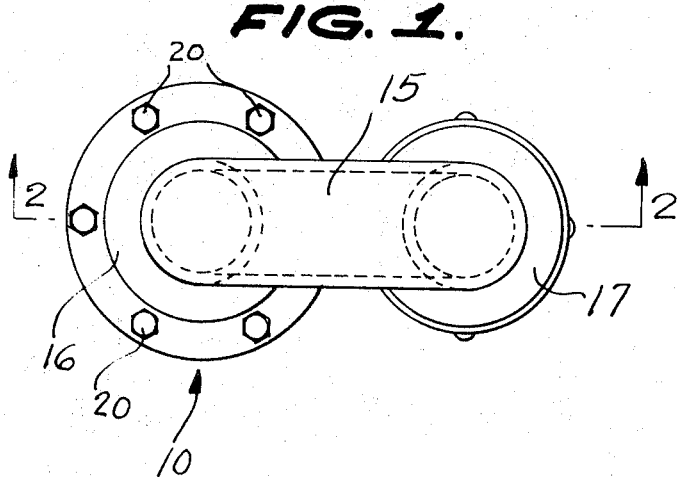
FIG. 1 is a top plan view of the invention.
Figure 2:
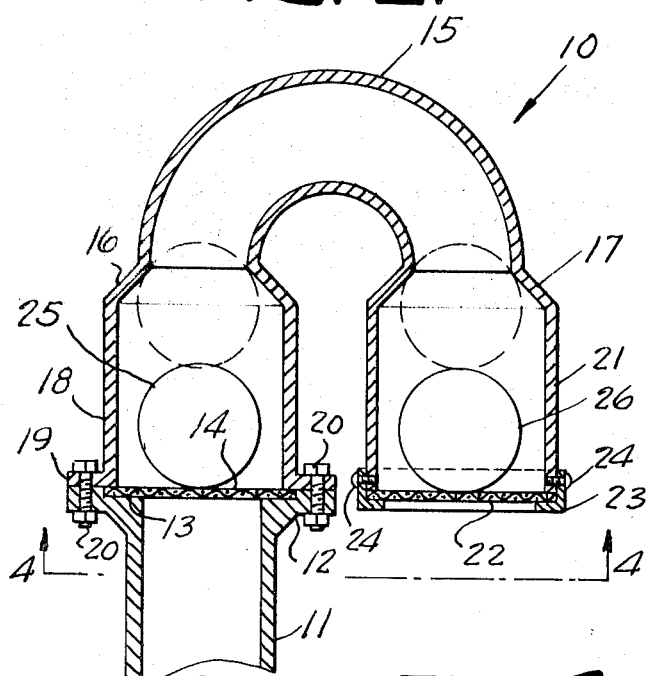
FIG. 2 is a vertical sectional view taken along the line 2—2 of FIG. 1, looking in the direction of the arrows.
Figure 3:
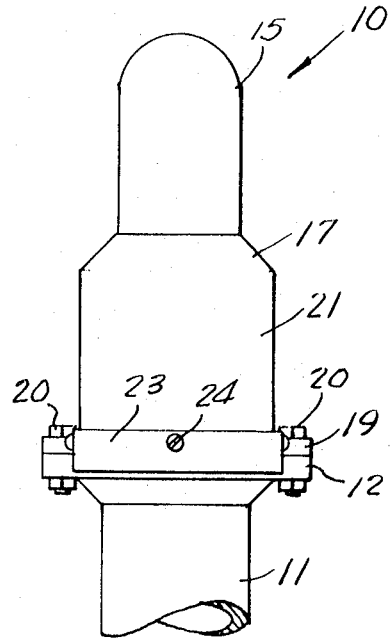
FIG. 3 is a side elevation of the invention.
Figure 4:
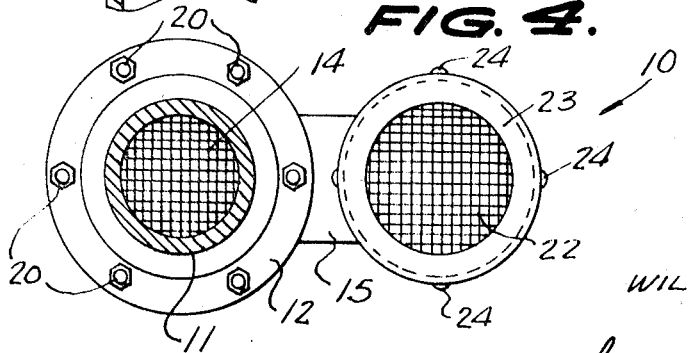
FIG. 4 is a horizontal section taken along the line 4—4 of FIG. 2, looking in the direction of the arrows.

Referring now to the drawings in detail wherein like reference characters indicate like parts throughout the several figures the reference numeral 10 indicates generally a double check valve assembly constructed in accordance with the invention.

The double check valve assembly 10 is adapted for use with a vent pipe 11 which leads upwardly from a fuel tank (not shown). The vent pipe 11 has an annular flange 12 integrally formed on its upper end. The annular flange 12 has a seat 13 formed in its upper face to receive a screen 14 which is positioned therein.

The double check valve assembly 10 includes a generally U-shaped tubular body 15 having an outwardly flared valve seat 16 formed on one end thereof with an identical outwardly flared valve seat 17 integrally formed on the opposite end thereof.

A generally cylindrical valve chamber 18 in integrally formed on the outwardly flared valve seat 16 and extends downwardly therefrom terminating in an annular flange 19 having a diameter equal to that of the annular flange 12. The flange 19 engages against the upper side of the screen 14 securing it in the seat 13. A plurality of bolts 20 extend through the flanges 12, 19 releaseably securing them together.

A generally cylindrical valve chamber 21 is integrally formed on the outwardly flared valve seat 17 and depends therefrom in spaced-apart generally parallel relation to the cylindrical valve chamber 18. The cylindrical valve chamber 21 has a circular screen 22 in engagement with its lower end and held in position thereon by a circular rim 23 which is detachably secured to the lower end of the valve chamber 21 by a plurality of bolts 24.

A floatable ball valve 25 is positioned in the valve chamber 13 and is adapted for engagement with the valve seat 16 to seal one end of the U-shaped tubular body 15. A second floatable ball valve 26 is positioned in the valve chamber 21 and is adapted for engagement with the valve seat 17 to seal the opposite end of the tubular body 15. The ball valve 25 normally rests on the screen 14 to permit free passage of gases emitted from the vent pipe 11. The floatable ball valve 26 normally rests on the screen 22 permitting free passage of gases through the body 15 in either direction.

In the use and operation of the invention the vent pipe 11 extends upwardly from a pipe to be vented and the double check valve assembly 10 is secured to the upper end thereof. In the event that fluid from the tank passes upwardly through the vent pipe 11 into the valve chamber 18 the ball valve 25 will float and come into sealing contact with the valve seat 16 to prevent the fluid in the valve chamber 18 from passing upwardly into the tubular body 15. As soon as the level of fluid in the valve chamber 18 lowers the ball valve 25 will drop to the screen 14 permitting the vented gases to flow through the body 15.

In the event the fluids flow through the screen 22 into the valve chamber 21 the ball valve 26 will float on the fluid and seal against the valve seat 17 to prevent the fluids from passing into the body 15 and hence into the tank through the vent pipe 11. As soon as the level of fluid drops emptying the valve chamber 21 the ball valve 26 will drop onto the screen 22 opening the outer end of the body 15 to permit the free flow of gases therethrough.

The double check valve of the instant invention provides for a free flow of gas vented through vent pipe 11 without back pressure while completely preventing the flow of fluids through the body 15 in either direction.

Having thus described the preferred embodiment of the invention it should be understood that numerous structural modifications and adaptions may be resorted to without departing from the spirit of the invention.

What is claimed is:

1. A double check valve assembly for controlling a vent pipe of the type having an outwardly projecting annular flange integrally formed on its upper end comprising an inverted U-shaped tubular body, a generally cylindrical valve chamber having a diameter substantially greater than said tubular body, a frustoconical valve seat integrally connecting said valve chamber with one end of said tubular body, an outwardly extending annular flange integrally formed on the lower open end of said valve chamber, a screen extending across the lower open end of said valve chamber, means connecting said flanges with said vent pipe and said valve chamber in communication through said screen, a second valve chamber having a diameter equal to said first valve chamber, a second inverted frustoconical valve seat integrally connecting said second valve chamber with the opposite end of said body, a screen detachably secured to the lower open end of said second valve chamber, and a spherical floatable ball valve in each valve chamber adapted on floating to the upper portion thereof to cooperate with a respective valve seat and seal one end of said tubular body.